US010500966B2

(12) United States Patent
Chen et al.

(10) Patent No.: US 10,500,966 B2
(45) Date of Patent: *Dec. 10, 2019

(54) ADAPTIVE BOOST VOLTAGE FOR HYBRID VEHICLE OPERATION

(71) Applicant: Ford Global Technologies, LLC, Dearborn, MI (US)

(72) Inventors: Lihua Chen, Farmington Hills, MI (US); Yan Zhou, Canton, MI (US); Shuitao Yang, Dearborn Heights, MI (US); Mohammed Khorshed Alam, Dearborn, MI (US); Fan Xu, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 456 days.

This patent is subject to a terminal disclaimer.

(21) Appl. No.: 15/366,081

(22) Filed: Dec. 1, 2016

(65) Prior Publication Data

US 2018/0154787 A1  Jun. 7, 2018

(51) Int. Cl.
*H02M 3/158* (2006.01)
*B60L 11/18* (2006.01)
*H02M 1/15* (2006.01)
*H02M 7/5387* (2007.01)
*B60W 50/08* (2012.01)
*B60L 53/14* (2019.01)
(Continued)

(52) U.S. Cl.
CPC .......... *B60L 11/1816* (2013.01); *B60L 50/10* (2019.02); *B60L 53/14* (2019.02); *B60W 50/082* (2013.01);
(Continued)

(58) Field of Classification Search
CPC .... H02M 3/158; H02M 7/53871; H02M 1/15; H02M 2001/008; H02M 2001/007; H02M 2001/0054; H02M 3/157; B60W 50/082; B60W 2540/04; B60W 2530/14; B60L 11/1816; B60L 50/10; B60L 53/14; B60L 2240/527; B60L 2210/40; B60L 2210/30; Y02T 90/127; Y02T 90/14; Y02T 10/7258; Y02T 10/70; Y02T 10/7072; Y02T 10/92; Y02T 10/7241; Y02T 10/7005;
(Continued)

(56) References Cited

U.S. PATENT DOCUMENTS 7,675,244 B2 *  3/2010  Blondia ............. H05B 41/2882
                                                315/209 R
7,898,331 B2 *  3/2011  Udupa ................ H03F 3/45479
                                                250/214 A
(Continued)

OTHER PUBLICATIONS

Step Motor Basics Guide, Step Motor Basics, A Brief Guide to Motor Theory and Design, Printed Jul. 21, 2016, 6 pages.

*Primary Examiner* — Pinping Sun
(74) *Attorney, Agent, or Firm* — David B. Kelley; Brooks Kushman P.C.

(57) ABSTRACT

A powertrain includes a DC-DC converter, an electric machine, and a controller. The DC-DC converter may be configured to output a bus voltage. The controller may be configured to, in response to a torque request exceeding an available torque of the electric machine, command the converter to boost the bus voltage to a discrete step value selected from a predetermined number of available discrete step values, that changes in response to a selected operating mode of the powertrain changing, to increase the available torque.

17 Claims, 7 Drawing Sheets

(51) Int. Cl.
  *B60L 50/10* (2019.01)
  *B60K 6/22* (2007.10)
  *H02M 3/157* (2006.01)
  *H02M 1/00* (2006.01)

(52) U.S. Cl.
  CPC ............ *H02M 1/15* (2013.01); *H02M 3/158* (2013.01); *H02M 7/53871* (2013.01); *B60K 6/22* (2013.01); *B60L 2210/30* (2013.01); *B60L 2210/40* (2013.01); *B60L 2240/527* (2013.01); *B60W 2530/14* (2013.01); *B60W 2540/04* (2013.01); *B60Y 2200/92* (2013.01); *B60Y 2400/61* (2013.01); *H02M 3/157* (2013.01); *H02M 2001/007* (2013.01); *H02M 2001/008* (2013.01); *H02M 2001/0054* (2013.01); *Y02T 10/70* (2013.01); *Y02T 10/7005* (2013.01); *Y02T 10/7072* (2013.01); *Y02T 10/7077* (2013.01); *Y02T 10/7241* (2013.01); *Y02T 10/7258* (2013.01); *Y02T 10/92* (2013.01); *Y02T 90/127* (2013.01); *Y02T 90/14* (2013.01); *Y10S 903/904* (2013.01)

(58) Field of Classification Search
  CPC ............ Y02T 10/7077; Y10S 903/904; B60Y 2400/61; B60Y 2200/92; B60K 6/22
  See application file for complete search history.

(56) References Cited

U.S. PATENT DOCUMENTS

| | | | | |
|---|---|---|---|---|
| 7,911,162 B2* | 3/2011 | Hanada | ............ | B60L 50/51 |
| | | | | 318/139 |
| 9,126,587 B2* | 9/2015 | Yamazaki | ............ | B60W 20/19 |
| 2002/0171397 A1* | 11/2002 | Adrian | ............ | H01M 6/5033 |
| | | | | 320/119 |
| 2008/0231115 A1* | 9/2008 | Cho | ............ | H02J 1/08 |
| | | | | 307/41 |
| 2009/0058337 A1* | 3/2009 | Kato | ............ | H02P 6/182 |
| | | | | 318/400.09 |
| 2009/0160380 A1* | 6/2009 | Yamada | ............ | B60L 15/20 |
| | | | | 318/400.15 |
| 2009/0230901 A1* | 9/2009 | Amano | ............ | B60L 50/16 |
| | | | | 318/400.3 |
| 2009/0237019 A1* | 9/2009 | Yamakawa | ............ | H02P 23/009 |
| | | | | 318/400.09 |
| 2011/0241584 A1 | 10/2011 | He et al. | | |
| 2011/0248663 A1 | 10/2011 | Yamakawa et al. | | |
| 2012/0043818 A1* | 2/2012 | Stratakos | ............ | H02J 3/383 |
| | | | | 307/77 |
| 2012/0277946 A1 | 11/2012 | Yamamoto et al. | | |
| 2014/0084679 A1* | 3/2014 | Li | ............ | B60L 8/003 |
| | | | | 307/10.1 |
| 2014/0139156 A1* | 5/2014 | Hayashi | ............ | H02P 21/02 |
| | | | | 318/400.3 |
| 2014/0332242 A1* | 11/2014 | Chen | ............ | B25B 23/147 |
| | | | | 173/20 |
| 2015/0200593 A1* | 7/2015 | Stoichita | ............ | H02M 3/158 |
| | | | | 323/271 |
| 2015/0232095 A1* | 8/2015 | Sato | ............ | B60L 58/15 |
| | | | | 701/22 |
| 2016/0075241 A1 | 3/2016 | Hao et al. | | |
| 2017/0012565 A1* | 1/2017 | Oi | ............ | H02P 6/085 |
| 2017/0063233 A1* | 3/2017 | Lehn | ............ | H02M 3/158 |
| 2017/0085183 A1* | 3/2017 | Notsch | ............ | H02M 3/33507 |
| 2017/0274777 A1* | 9/2017 | Alam | ............ | H02M 3/158 |

* cited by examiner

ADAPTIVE BOOST VOLTAGE FOR HYBRID VEHICLE OPERATION

TECHNICAL FIELD

This application is generally related to a DC-DC converter that is configured to select a boost voltage and to operate at the boost voltage for a predetermined time.

BACKGROUND

Electrified vehicles including hybrid-electric vehicles (HEVs) and battery electric vehicles (BEVs) rely on a traction battery to provide power to a traction motor for propulsion and a power inverter therebetween to convert direct current (DC) power to alternating current (AC) power. The typical AC traction motor is a 3-phase motor that may be powered by 3 sinusoidal signals each driven with 120 degrees phase separation. The traction battery is configured to operate in a particular voltage range and provide a maximum current. The traction battery is alternatively referred to as a high-voltage battery wherein a terminal voltage of a typical traction battery is over 100 Volts DC. However, improved performance of electric machines may be achieved by operating in a different voltage range, typically at voltages greater than the traction battery terminal voltage. Likewise, the current requirements to drive a vehicular electric machine are commonly referred to as high current.

Many electrified vehicles include a DC-DC converter, also referred to as a variable voltage converter (VVC), to convert the voltage of the traction battery to an operational voltage level of the electric machine. The electric machine, which may include a traction motor, may require a high voltage and high current. Due to the voltage, current and switching requirements, a solid state switch such as an Insulated Gate Bipolar junction Transistor (IGBT) is typically used to generate the signals in the power inverter and the VVC.

SUMMARY

A powertrain includes a DC-DC converter, an electric machine, and a controller. The DC-DC converter may be configured to output a bus voltage. The controller may be configured to, in response to a torque request exceeding an available torque of the electric machine, command the converter to boost the bus voltage to a discrete step value selected from a predetermined number of available discrete step values, that changes in response to a selected operating mode of the powertrain changing, to increase the available torque.

A vehicle includes an electric machine and a controller. The electric machine may be configured to provide propulsive force to the vehicle at a bus voltage. The controller may be configured to cause a converter to output the bus voltage at a discrete step value that is selected from a predetermined number of available discrete step values, and to change at least some of the available discrete step values in response to an operating mode of the electric machine changing.

A method of controlling a DC-DC converter includes, in response to a torque request to a motor coupled with the converter exceeding an available torque, outputting a bus voltage and updating magnitudes of at least some of the discrete steps. The outputting by the converter for at least a predetermined duration of a bus voltage at a discrete step value is selected from a predetermined number of available discrete step values. The updating of magnitudes of at least some of the discrete step values may be based on historical powertrain operating data.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Solid state devices (SSD), such as Insulated Gate Bipolar junction Transistors (IGBTs), Metal Oxide Semiconductor Field Effect Transistors (MOSFETs), or Bipolar Junction Transistors (BJTs) are widely used in a variety of automotive and industrial applications, such as electric motor drives, power inverters, DC-DC converters, and power modules. Operation of an IGBT and a MOSFET is voltage controlled, in which the operation is based on a voltage applied to a gate of the IGBT or MOSFET, while operation of a BJT is current controlled, in which the operation is based on a current applied to a base of the BJT. Here, the use of an IGBT will be discussed, however the structure and methods are applicable to other SSDs. Operation of an IGBT is controlled by a gate voltage supplied by a gate driver. Conventional gate drivers are typically based on a voltage, greater than a threshold voltage, applied to the IGBT gate with a current limiting resistor, which typically consists of a switchable voltage source and a gate resistor. A low gate resistance would lead to a fast switching speed and low switching loss, but may also cause higher stresses on the semiconductor devices, e.g. over-voltage stresses. Therefore, the gate resistance is selected to seek a compromise between switching loss, switching delay, and stresses. When turning off an IGBT, the gate resistor reduces the current flowing from the gate and thereby increases a shutoff time of the IGBT. Also, a gate driver may use different turn-on and turn-off gate resistors to separately control turn-on and turn-off switching speed.

Figure 1:
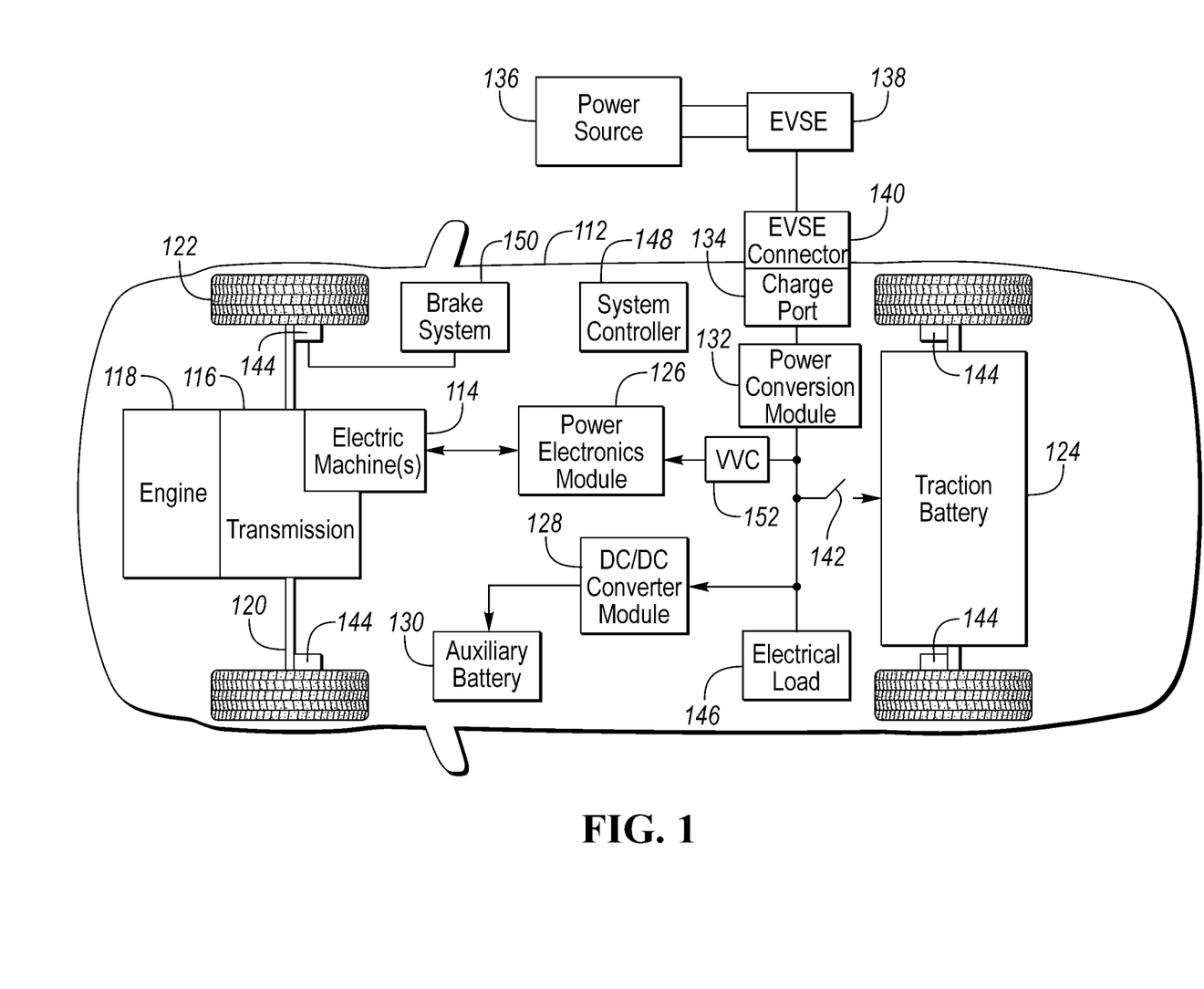
FIG. 1 is a diagram of a hybrid vehicle illustrating typical drivetrain and energy storage components with a variable voltage converter and power inverter therebetween.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
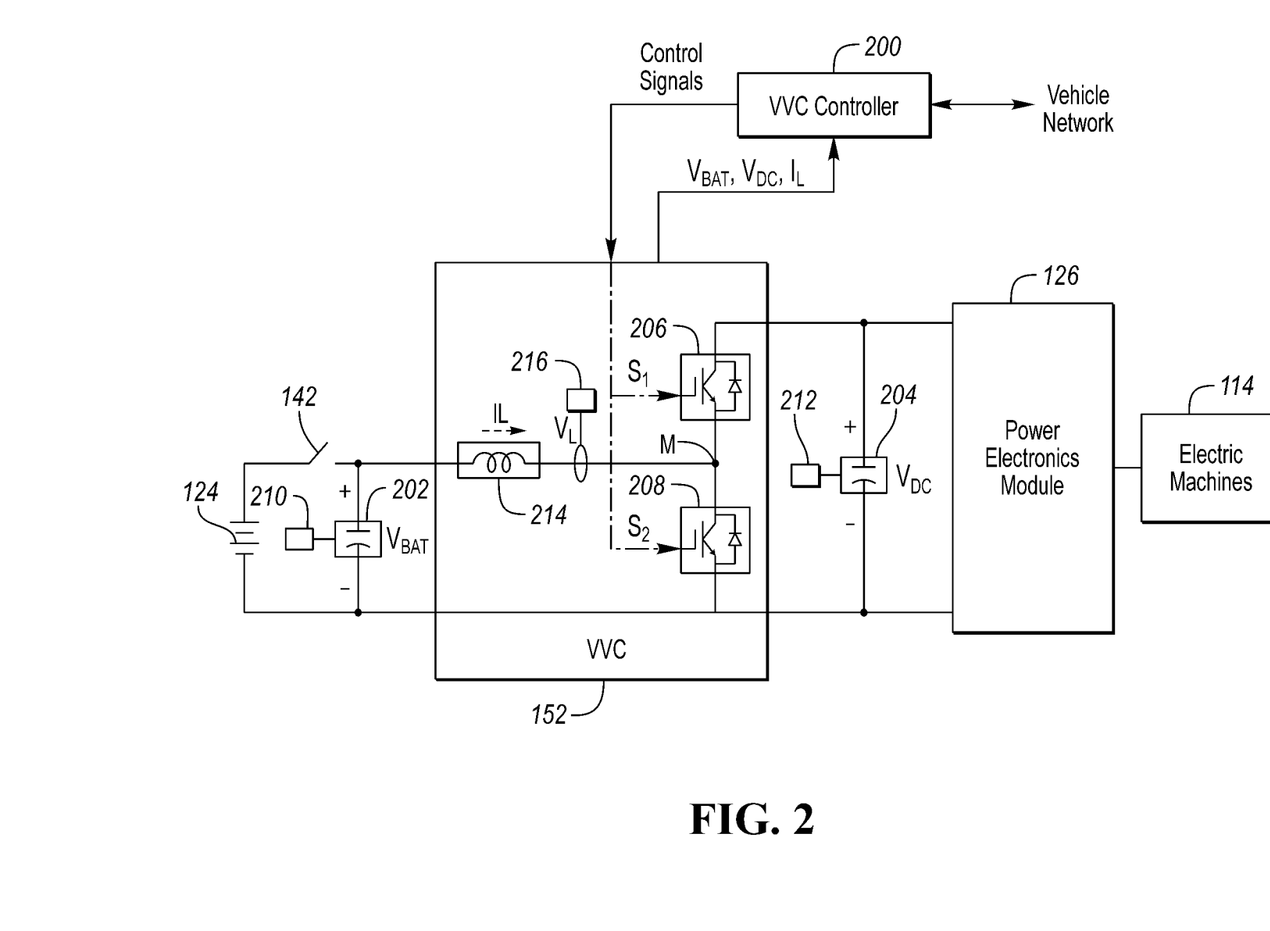
FIG. 2 is a schematic diagram of a vehicular variable voltage converter.

FIG. 2 depicts a diagram of a VVC 152 that is configured as a boost converter. The VVC 152 may include input terminals that may be coupled to terminals of the traction battery 124 through the contactors 142. The VVC 152 may include output terminals coupled to terminals of the power electronics module 126. The VVC 152 may be operated to cause a voltage at the output terminals to be greater than a voltage at the input terminals. The vehicle 112 may include a VVC controller 200 that monitors and controls electrical parameters (e.g., voltage and current) at various locations within the VVC 152. In some configurations, the VVC controller 200 may be included as part of the VVC 152. The VVC controller 200 may determine an output voltage reference, $V^*_{dc}$. The VVC controller 200 may determine, based on the electrical parameters and the voltage reference, $V^*_{dc}$, a control signal sufficient to cause the VVC 152 to achieve the desired output voltage. In some configurations, the control signal may be implemented as a pulse-width modulated (PWM) signal in which a duty cycle of the PWM signal is varied. The control signal may be operated at a predetermined switching frequency. The VVC controller 200 may command the VVC 152 to provide the desired output voltage using the control signal. The particular control signal at which the VVC 152 is operated may be directly related to the amount of voltage boost to be provided by the VVC 152.

The output voltage of the VVC 152 may be controlled to achieve a desired reference voltage. In some configurations, the VVC 152 may be a boost converter. In a boost converter configuration in which the VVC controller 200 controls the duty cycle, the ideal relationship between the input voltage $V_{in}$ and the output voltage $V_{out}$ and the duty cycle D may be illustrated using the following equation:

$$V_{out} = \frac{V_{in}}{(1-D)} \quad 1)$$

The desired duty cycle, D, may be determined by measuring the input voltage (e.g., traction battery voltage) and setting the output voltage to the reference voltage. The VVC 152 may be a buck converter that reduces the voltage from input to output. In a buck configuration, a different expression relating the input and output voltage to the duty cycle may be derived. In some configurations, the VVC 152 may be a buck-boost converter that may increase or decrease the input voltage. The control strategy described herein is not limited to a particular variable voltage converter topology.

With reference to FIG. 2, the VVC 152 may boost or "step up" the voltage potential of the electrical power provided by the traction battery 124. The traction battery 124 may provide high voltage (HV) DC power. In some configurations, the traction battery 124 may provide a voltage between 150 and 400 Volts. The contactor 142 may be electrically coupled in series between the traction battery 124 and the VVC 152. When the contactor 142 is closed, the HV DC power may be transferred from the traction battery 124 to the VVC 152. An input capacitor 202 may be electrically coupled in parallel to the traction battery 124. The input capacitor 202 may stabilize the bus voltage and reduce any voltage and current ripple. The VVC 152 may receive the HV DC power and boost or "step up" the voltage potential of the input voltage according to the duty cycle.

An output capacitor 204 may be electrically coupled between the output terminals of the VVC 152. The output capacitor 204 may stabilize the bus voltage and reduce voltage and current ripple at the output of the VVC 152.

Further with reference to FIG. 2, the VVC 152 may include a first switching device 206 and a second switching device 208 for boosting an input voltage to provide the boosted output voltage. The switching devices 206, 208 may be configured to selectively flow a current to an electrical load (e.g., power electronics module 126 and electric machines 114). Each switching device 206, 208 may be individually controlled by a gate drive circuit (not shown) of the VVC controller 200 and may include any type of controllable switch (e.g., an insulated gate bipolar transistor (IGBT) or field-effect transistor (FET)). The gate drive circuit may provide electrical signals to each of the switching devices 206, 208 that are based on the control signal (e.g., duty cycle of PWM control signal). A diode may be coupled across each of the switching devices 206, 208. The switching devices 206, 208 may each have an associated switching loss. The switching losses are those power losses that occur during state changes of the switching device (e.g., on/off and off/on transitions). The switching losses may be quantified by the current flowing through and the voltage across the switching device 206, 208 during the transition. The switching devices may also have associated conduction losses that occur when the device is switched on.

The vehicle system may include sensors for measuring electrical parameters of the VVC 152. A first voltage sensor 210 may be configured to measure the input voltage, (e.g., voltage of the battery 124), and provide a corresponding input signal ($V_{bat}$) to the VVC controller 200. In one or more embodiments, the first voltage sensor 210 may measure the voltage across the input capacitor 202, which corresponds to the battery voltage. A second voltage sensor 212 may measure the output voltage of the VVC 152 and provide a corresponding input signal ($V_{dc}$) to the VVC controller 200. In one or more embodiments, the second voltage sensor 212 may measure the voltage across the output capacitor 204, which corresponds to the DC bus voltage. The first voltage sensor 210 and the second voltage sensor 212 may include circuitry to scale the voltages to a level appropriate for the VVC controller 200. The VVC controller 200 may include circuitry to filter and digitize the signals from the first voltage sensor 210 and the second voltage sensor 212.

An input inductor 214 may be electrically coupled in series between the traction battery 124 and the switching devices 206, 208. The input inductor 214 may alternate between storing and releasing energy in the VVC 152 to enable the providing of the variable voltages and currents as VVC 152 output, and the achieving of the desired voltage boost. A current sensor 216 may measure the input current through the input inductor 214 and provide a corresponding current signal ($I_L$) to the VVC controller 200. The input current through the input inductor 214 may be a result of the voltage difference between the input and the output voltage of the VVC 152, the conducting time of the switching devices 206, 208, and the inductance L of the input inductor 214. The VVC controller 200 may include circuitry to scale, filter, and digitize the signal from the current sensor 216.

The VVC controller 200 may be programmed to control the output voltage of the VVC 152. The VVC controller 200 may receive input from the VVC 152 and other controllers via the vehicle network, and determine the control signals. The VVC controller 200 may monitor the input signals ($V_{bat}$, $V_{dc}$, $I_L$, $V^*_{dc}$) to determine the control signals. For example, the VVC controller 200 may provide control signals to the gate drive circuit that correspond to a duty cycle command. The gate drive circuit may then control each switching device 206, 208 based on the duty cycle command.

The control signals to the VVC 152 may be configured to drive the switching devices 206, 208 at a particular switching frequency. Within each cycle of the switching frequency, the switching devices 206, 208 may be operated at the specified duty cycle. The duty cycle defines the amount of time that the switching devices 206, 208 are in an on-state and an off-state. For example, a duty cycle of 100% may operate the switching devices 206, 208 in a continuous on-state with no turn off. A duty cycle of 0% may operate the switching devices 206, 208 in a continuous off-state with no turn on. A duty cycle of 50% may operate the switching devices 206, 208 in an on-state for half of the cycle and in an off-state for half of the cycle. The control signals for the two switches 206, 208 may be complementary. That is, the control signal sent to one of the switching devices (e.g., 206) may be an inverted version of the control signal sent to the other switching device (e.g., 208). The use of complementary control of the switching devices 206, 208 is desirable to avoid a shoot-through condition in which current flows directly through a high-side switching device 206 and a low-side switching device 208. The high-side switching device 206 is also called a pass device 206 and the low-side switching device 208 is also called a charging device 208.

Figure 4:
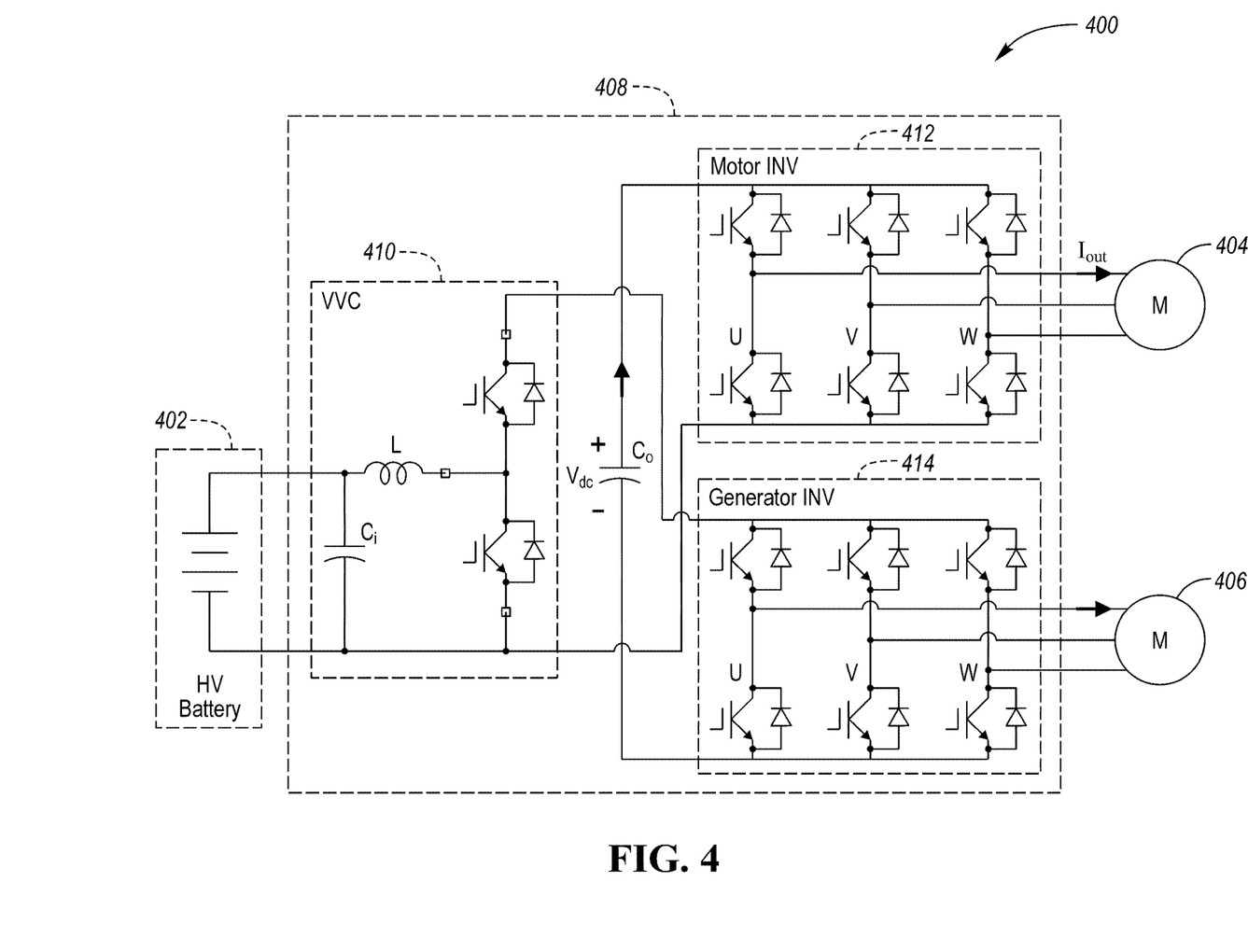
FIG. 4 is a schematic diagram of a dual electric machine and inverter system having a traction battery and a variable voltage converter therebetween.

The current that is controlled by the switching devices 206, 208 may include a ripple component that has a magnitude that varies with a magnitude of the current, and the duty cycle and switching frequency of the switching devices 206, 208. Relative to the input current, the worst case ripple current magnitude occurs during relatively high input current conditions. When the duty cycle is fixed, an increase in the inductor current causes an increase in magnitude of the ripple current as illustrated in FIG. 4. The magnitude of the ripple current is also related to the duty cycle. The highest magnitude ripple current occurs when the duty cycle equals 50%. The general relationship between the inductor ripple current magnitude and the duty cycle may be as shown in FIG. 5. Based on these facts, it may be beneficial to implement measures to reduce the ripple current magnitude under high current and mid-range duty cycle conditions.

When designing the VVC 152, the switching frequency and the inductance value of the inductor 214 may be selected to satisfy a maximum allowable ripple current magnitude. The ripple component may be a periodic variation that appears on a DC signal. The ripple component may be defined by a ripple component magnitude and a ripple component frequency. The ripple component may have harmonics that are in an audible frequency range that may add to the noise signature of the vehicle. Further, the ripple component may cause difficulties with accurately controlling devices fed by the source. During switching transients, the switching devices 206, 208 may turn off at the maximum inductor current (DC current plus ripple current) which may cause large voltage spike across the switching devices 206, 208. Because of size and cost constraints, the inductance value may be selected based on the conducted current. In general, as current increases the inductance may decrease due to saturation.

The switching frequency may be selected to limit a magnitude of the ripple current component under worst case scenarios (e.g., highest input current and/or duty cycle close to 50% conditions). The switching frequency of the switching devices 206, 208 may be selected to be a frequency (e.g., 10 kHz) that is greater than a switching frequency of the motor/generator inverter (e.g., 5 kHz) that is coupled to an output of the VVC 152. In some applications, the switching frequency of the VVC 152 may be selected to be a predetermined fixed frequency. The predetermined fixed frequency is generally selected to satisfy noise and ripple current specifications. However, the choice of the predetermined fixed frequency may not provide best performance over all operating ranges of the VVC 152. The predetermined fixed frequency may provide best results at a particular set of operating conditions, but may be a compromise at other operating conditions.

Increasing the switching frequency may decrease the ripple current magnitude and lower voltage stress across the switching devices 206, 208, but may lead to higher switching losses. While the switching frequency may be selected for worst case ripple conditions, the VVC 152 may only operate under the worst case ripple conditions for a small percentage of the total operating time. This may lead to unnecessarily high switching losses that may lower fuel economy. In addition, the fixed switching frequency may concentrate the noise spectrum in a very narrow range. The increased noise density in this narrow range may result in noticeable noise, vibration, and harshness (NVH) issues.

The VVC controller 200 may be programmed to vary the switching frequency of the switching devices 206, 208 based on the duty cycle and the input current. The variation in switching frequency may improve fuel economy by reducing switching losses and reduce NVH issues while maintaining ripple current targets under worst case operating conditions.

During relatively high current conditions, the switching devices 206, 208 may experience increased voltage stress. At a maximum operating current of the VVC 152, it may be desired to select a relatively high switching frequency that reduces the ripple component magnitude with a reasonable level of switching losses. The switching frequency may be selected based on the input current magnitude such that as the input current magnitude increases, the switching frequency increases. The switching frequency may be increased up to a predetermined maximum switching frequency. The predetermined maximum switching frequency may be a level that provides a compromise between lower ripple component magnitudes and higher switching losses. The switching frequency may be changed in discrete steps or continuously over the operating current range.

The VVC controller 200 may be programmed to reduce the switching frequency in response to the current input being less than a predetermined maximum current. The predetermined maximum current may be a maximum operating current of the VVC 152. The change in the switching frequency may be based on the magnitude of the current input to the switching devices 206, 208. When the current is greater than the predetermined maximum current, the switching frequency may be set to a predetermined maximum switching frequency. As the current decreases, the magnitude of the ripple component decreases. By operating at lower switching frequencies as the current decreases, switching losses are reduced. The switching frequency may be varied based on the power input to the switching devices. As the input power is a function of the input current and the battery voltage, the input power and input current may be used in a similar manner.

Since the ripple current is also affected by the duty cycle, the switching frequency may be varied based on the duty cycle. The duty cycle may be determined based on a ratio of the input voltage to the output voltage. As such, the switching frequency may also be varied based on the ratio between the input voltage and the output voltage. When the duty cycle is near 50%, the predicted ripple current magnitude is a maximum value and the switching frequency may be set to the predetermined maximum frequency. The predetermined maximum frequency may be a maximum switching frequency value that is selected to minimize the ripple current magnitude. The switching frequency may be changed in discrete steps or continuously over the duty cycle range.

The VVC controller 200 may be programmed to reduce the switching frequency from the predetermined maximum frequency in response to a magnitude of a difference between the duty cycle and the duty cycle value (e.g, 50%) at which the predicted ripple component magnitude is a maximum. When the magnitude of the difference is less than a threshold, the switching frequency may be set to the predetermined frequency. When the magnitude of the difference decreases, the switching frequency may be increased toward the predetermined maximum frequency to reduce the ripple component magnitude. When the magnitude of the difference is less than a threshold, the switching frequency may be set to the predetermined maximum frequency.

The switching frequency may be limited to be between the predetermined maximum frequency and a predetermined minimum frequency. The predetermined minimum frequency may be a frequency level that is greater than a predetermined switching frequency of the power electronic module 126 that is coupled to an output of the variable voltage converter 152. The switching frequency may also be based on parasitic inductance associated with the gate of the IGBT.

Figure 3:
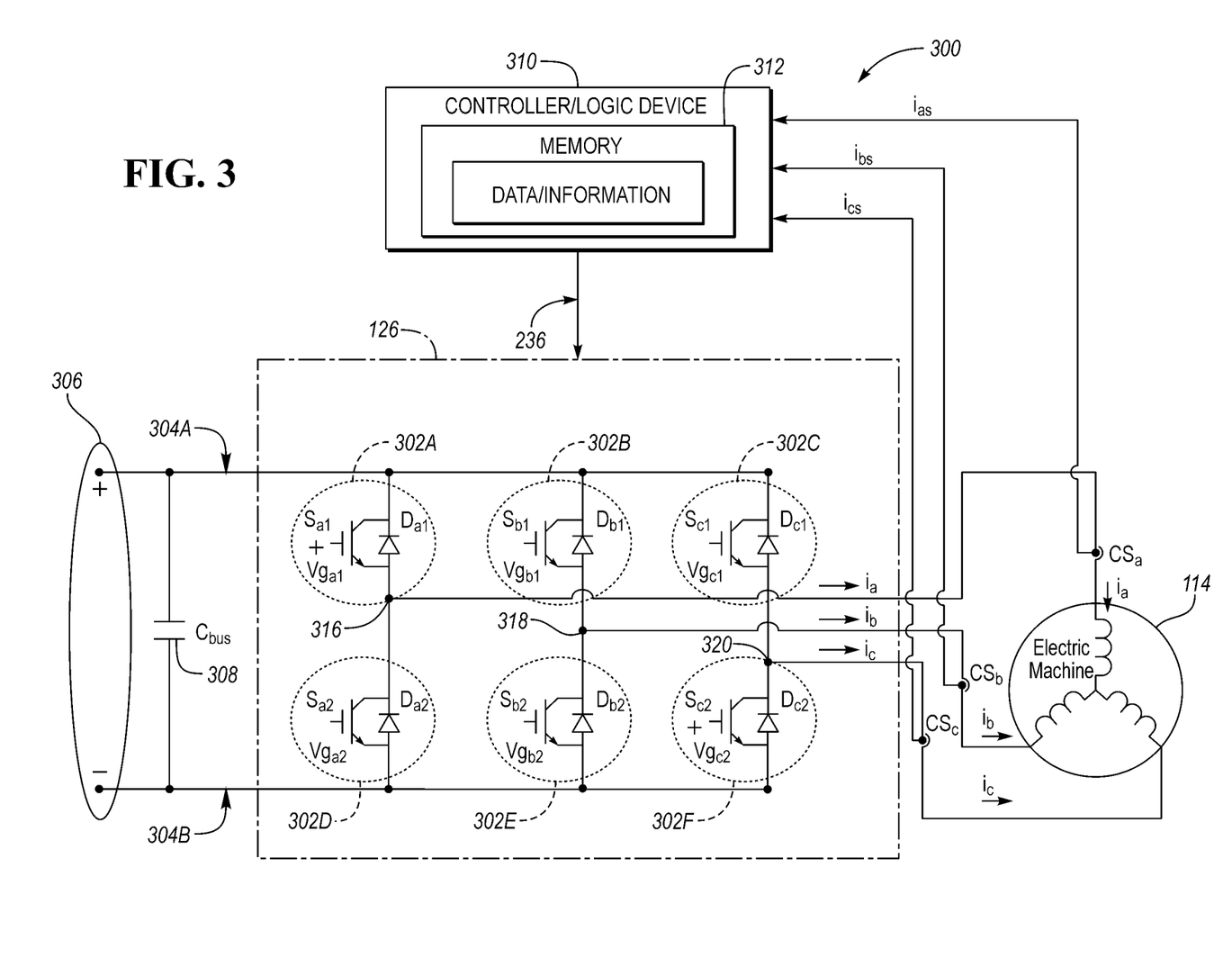
FIG. 3 is a schematic diagram of a vehicular electric machine inverter.

With reference to FIG. 3, a system 300 is provided for controlling a power electronics module (PEM) 126. The PEM 126 of FIG. 3 is shown to include a plurality of switches 302 (e.g., IGBTs) configured to collectively operate as an inverter with first, second, and third phase legs 316, 318, 320. While the inverter is shown as a three-phase converter, the inverter may include additional phase legs. For example, the inverter may be a four-phase converter, a five-phase converter, a six-phase converter, etc. In addition, the PEM 126 may include multiple converters with each inverter in the PEM 126 including three or more phase legs. For example, the system 300 may control two or more inverters in the PEM 126. The PEM 126 may further include a DC to DC converter having high power switches (e.g., IGBTs) to convert a power electronics module input voltage to a power electronics module output voltage via boost, buck or a combination thereof.

As shown in FIG. 3, the inverter may be a DC-to-AC converter. In operation, the DC-to-AC converter receives DC power from a DC power link 306 through a DC bus 304 and converts the DC power to AC power. The AC power is transmitted via the phase currents ia, ib, and is to drive an AC machine also referred to as an electric machine 114, such as a three-phase permanent-magnet synchronous motor (PMSM) as depicted in FIG. 3. In such an example, the DC power link 306 may include a DC storage battery to provide DC power to the DC bus 304. In another example, the inverter may operate as an AC-to-DC converter that converts AC power from the AC machine 114 (e.g., generator) to DC power, which the DC bus 304 can provide to the DC power link 306. Furthermore, the system 300 may control the PEM 126 in other power electronic topologies.

With continuing reference to FIG. 3, each of the phase legs 316, 318, 320 in the inverter includes power switches 302, which may be implemented by various types of controllable switches. In one embodiment, each power switch 302 may include a diode and a transistor, (e.g., an IGBT). The diodes of FIG. 3 are labeled $D_{a1}$, $D_{a2}$, $D_{b1}$, $D_{b2}$, $D_{c1}$, and $D_{c2}$ while the IGBTs of FIG. 3 are respectively labeled $S_{a1}$, $S_{a2}$, $S_{b1}$, $S_{b2}$, $S_{c1}$, and $S_{c2}$. The power switches $S_{a1}$, $S_{a2}$, $D_{a1}$, and $D_{a2}$ are part of phase leg A of the three-phase converter, which is labeled as the first phase leg A 316 in FIG. 3. Similarly, the power switches $S_{b1}$, $S_{b2}$, $D_{b1}$, and $D_{b2}$ are part of phase leg B 318 and the power switches $S_{c1}$, $S_{c2}$, $D_{c1}$, and $D_{c2}$ are part of phase leg C 320 of the three-phase converter. The inverter may include any number of the power switches 302 or circuit elements depending on the particular configuration of the inverter. The diodes ($D_{xx}$) are connected in parallel with the IGBTs ($S_{xx}$) however, as the polarities are reversed for proper operation, this configuration is often referred to as being connected anti-parallel. A diode in this anti-parallel configuration is also called a freewheeling diode. Each phase leg may be view as two switches configured in a half-bridge configuration and a typical three phase power inverter includes three half-bridges.

As illustrated in FIG. 3, current sensors $CS_a$, $CS_b$, and $CS_c$ are provided to sense current flow in the respective phase legs 316, 318, 320. FIG. 3 shows the current sensors $CS_a$, $CS_b$, and $CS_c$ separate from the PEM 126. However, current sensors $CS_a$, $CS_b$, and $CS_c$ may be integrated as part of the PEM 126 depending on its configuration. Current sensors $CS_a$, $CS_b$, and $CS_c$ of FIG. 3 are installed in series with each of phase legs A, B and C (i.e., phase legs 316, 318, 320 in FIG. 3) and provide the respective feedback signals $i_{as}$, $i_{bs}$, and $i_{cs}$ (also illustrated in FIG. 3) for the system 300. The feedback signals $i_{as}$, $i_{bs}$, and $i_{cs}$ may be raw current signals processed by logic device (LD) 310 or may be embedded or encoded with data or information about the current flow through the respective phase legs 316, 318, 320. Also, the power switches 302 (e.g., IGBTs) may include current sensing capability. The current sensing capability may include being configured with a current mirror output, which may provide data/signals representative of $i_{as}$, $i_{bs}$, and $i_{cs}$. The data/signals may indicate a direction of current flow, a magnitude of current flow, or both the direction and magnitude of current flow through the respective phase legs A, B, and C.

Referring again to FIG. 3, the system 300 includes a logic device (LD) or controller 310. The controller or LD 310 can be implemented by various types or combinations of electronic devices and/or microprocessor-based computers or controllers. To implement a method of controlling the PEM 126, the controller 310 may execute a computer program or algorithm embedded or encoded with the method and stored in volatile and/or persistent memory 312. Alternatively, logic may be encoded in discrete logic, a microprocessor, a microcontroller, or a logic or gate array stored on one or more integrated circuit chips. As shown in the embodiment of FIG. 3, the controller 310 receives and processes the feedback signals $i_{as}$, $i_{bs}$, and $i_{cs}$ to control the phase currents $i_a$, $i_b$, and $i_c$ such that the phase currents $i_a$, $i_b$, and $i_c$ flow through the phase legs 316, 318, 320 and into the respective windings of the electric machine 114 according to various current or voltage patterns. For example, current patterns can include patterns of phase currents $i_a$, $i_b$, and $i_c$ flowing into and away from the DC-bus 304 or a DC-bus capacitor 308. The DC-bus capacitor 308 of FIG. 3 is shown separate from the PEM 126. However, the DC-bus capacitor 308 may be integrated as part of the PEM 126.

As shown in FIG. 3, a storage medium 312 (hereinafter "memory"), such as computer-readable memory may store the computer program or algorithm embedded or encoded with the method. In addition, the memory 312 may store data or information about the various operating conditions or components in the PEM 126. For example, the memory 312 may store data or information about current flow through the respective phase legs 316, 318, 320. The memory 312 can be part of the controller 310 as shown in FIG. 3. However, the memory 312 may be positioned in any suitable location accessible by the controller 310.

As illustrated in FIG. 3, the controller 310 transmits at least one control signal 236 to the power converter system 126. The power converter system 126 receives the control signal 322 to control the switching configuration of the inverter and therefore the current flow through the respective phase legs 316, 318, and 320. The switching configuration is a set of switching states of the power switches 302 in the inverter. In general, the switching configuration of the inverter determines how the inverter converts power between the DC power link 306 and the electric machine 114.

To control the switching configuration of the inverter, the inverter changes the switching state of each power switch 302 in the inverter to either an ON state or an OFF state based on the control signal 322. In the illustrated embodiment, to switch the power switch 302 to either ON or OFF states, the controller/LD 310 provides the gate voltage (Vg) to each power switch 302 and therefore drives the switching state of each power switch 302. Gate voltages $Vg_{a1}$, $Vg_{a2}$, $Vg_{b1}$, $Vg_{b2}$, $Vg_{c1}$, and $Vg_{c2}$ (shown in FIG. 3) control the switching state and characteristics of the respective power switches 302. While the inverter is shown as a voltage-driven device in FIG. 3, the inverter may be a current-driven device or controlled by other strategies that switch the power switch 302 between ON and OFF states. The controller 310 may change the gate drive for each IGBT based on the rotational speed of the electric machine 114, the mirror current, or a temperature of the IGBT switch. The change in gate drive may be selected from a plurality of gate drive currents in which the change gate drive current is proportional to a change in IGBT switching speed.

As also shown in FIG. 3, each phase leg 316, 318, and 320 includes two switches 302. However, only one switch in each of the legs 316, 318, 320 can be in the ON state without shorting the DC power link 306. Thus, in each phase leg, the switching state of the lower switch is typically opposite the switching state of the corresponding upper switch. The top switches are typically referred to as high-side switches (i.e., 302A, 302B, 302C) and the lower switches are typically referred to as low-side switches (i.e., 302D, 302E, 302F). Consequently, a HIGH state of a phase leg refers to the upper switch in the leg in the ON state with the lower switch in the OFF state. Likewise, a LOW state of the phase leg refers to the upper switch in the leg in the OFF state with the lower switch in the ON state. As a result, IGBTs with current mirror capability may be on all IGBTs, a subset of IGBTs (e.g., $S_{a1}$, $S_{b1}$, $S_{c1}$) or a single IGBT.

Two situations can occur during an active state of the three-phase converter example illustrated in FIG. 2: (1) two phase legs are in the HIGH state while the third phase leg is in the LOW state, or (2) one phase leg is in the HIGH state while the other two phase legs are in the LOW state. Thus, one phase leg in the three-phase converter, which may be defined as the "reference" phase for a specific active state of the inverter, is in a state opposite to the other two phase legs, or "non-reference" phases, that have the same state. Consequently, the non-reference phases are either both in the HIGH state or both in the LOW state during an active state of the inverter.

FIG. 4 is a schematic diagram of a dual electric machine and inverter system 400 having a traction battery 402 and a variable voltage converter 410 therebetween. The system 400 is configured to drive two electric machines 404, 406 by two independent DC to AC power inverters 412 and 414 respectively. The two independent DC to AC power inverters 412 and 414 are supplied power by the variable voltage converter 410 that is coupled with the battery 402.

Figure 5A:
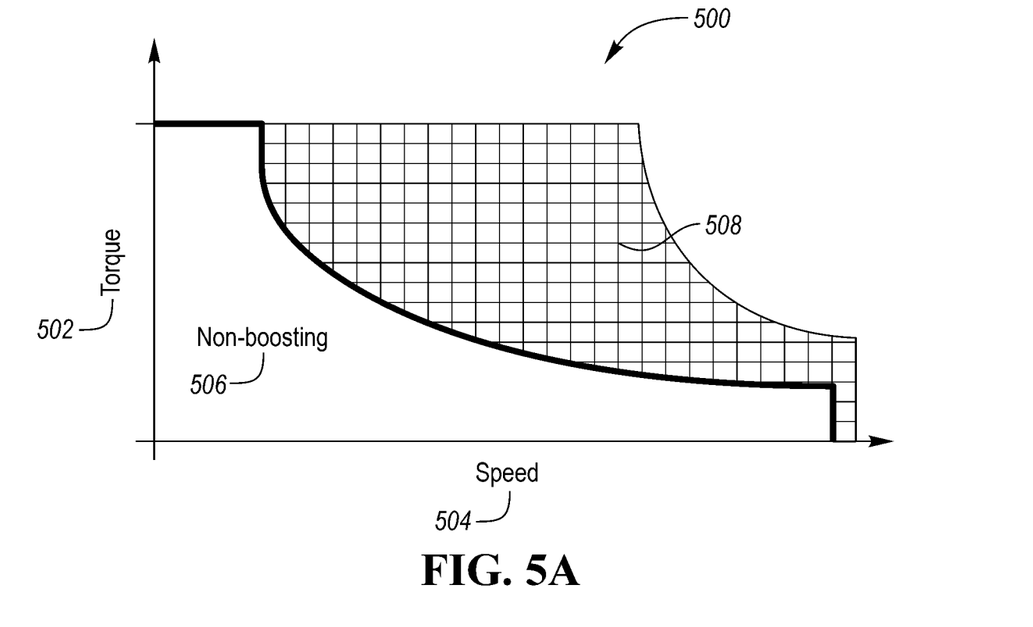
FIG. 5A is a graphical illustration of power limits for an electric machine at a motor torque with respect to angular speed and a bus voltage.

FIG. 5A is a graphical illustration of power limits 500 for an electric machine at a motor torque 502 with respect to angular speed 504 and a bus voltage. An inverter system such as the inverter system 400 of FIG. 4 that includes the DC-DC converter 410 (VVC) that is configured to either pass power from the battery to the inverters 412, 414 or converter the power. The power is passed by opening the low-side switch and closing the high-side switch so that power flows between the battery 402 and the inverters 412, 414 at the battery voltage. Power is converted by modulating the high-side and low-side switches utilizing the inductive field generated in the inductor L to change the input and output voltage. When the VVC is operated in a pass though mode, power capable of being provided by the electric machine is shown in the non-boosting area 506. The non-boosting area 506 changes based on torque 502 and angular velocity also referred to as speed 504. If power demand is greater than the available power in the non-boosting area 506, the VVC may increase the output voltage so that the system can operate in a boosting area 508. In general, the electric machine is configured to provide a maximum torque regardless of the speed 504, however at many speeds; the maximum torque is only available in the boosting area 508. Further, depending upon the system configuration, many operating points (i.e., torque 502 at a given speed 504) require the VVC to boost the voltage to operate in the boosting area 508. Often the DC-DC converter systems (e.g., VVC, and Inverter) are configured to continuously boost the voltage and to vary the voltage to meet the power demand such that power to the inverters 412, 414 is constantly changing.

Figure 5B:
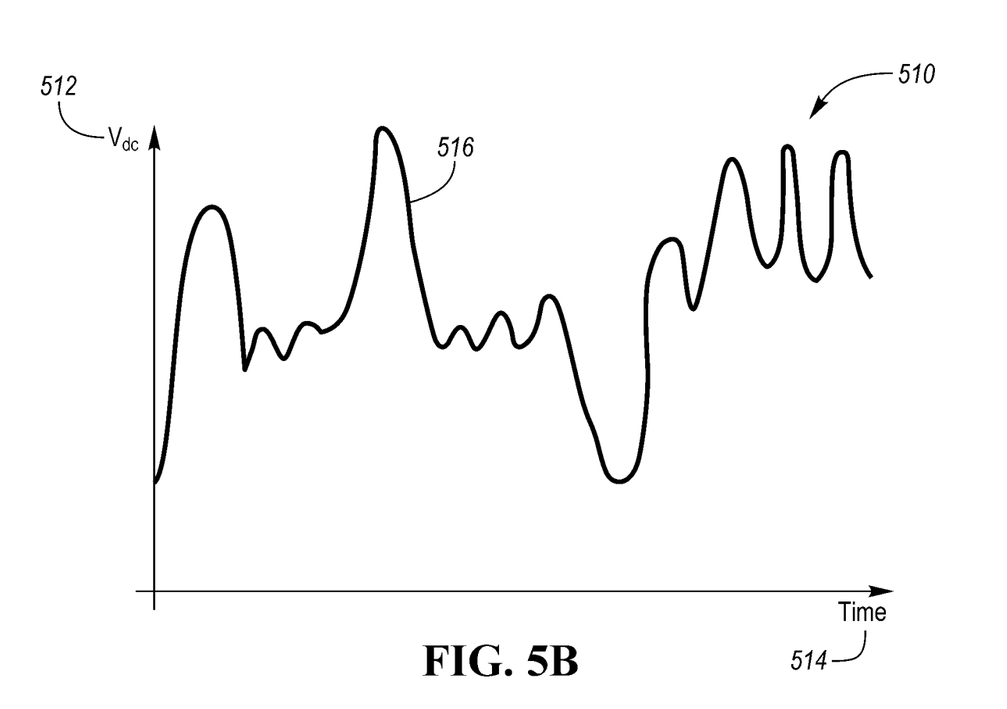
FIG. 5B is a graphical illustration of a bus voltage for a variable voltage converter supplying a continuous varying voltage to the inverter with respect to time during a drive cycle of a hybrid vehicle.

FIG. 5B is a graphical illustration 510 of a bus voltage 512 for a variable voltage converter supplying a continuous varying voltage to the inverter with respect to time 514 during a drive cycle of a hybrid vehicle. Here, the voltage profile 516 of the bus voltage 512 is shown with respect to time 514. In this graphical illustration 510, consider that at time 0 (i.e., the beginning of the voltage profile 516) the DC bus voltage 512 is also the battery voltage and the VVC is in a pass through mode, after which all operation requires the boosting of the battery voltage such that operation is in the boosting area 508. This would require constant changing of the duty cycle of the boost converter and therefore avoiding frequent DC bus voltage fluctuations.

Figure 6A:
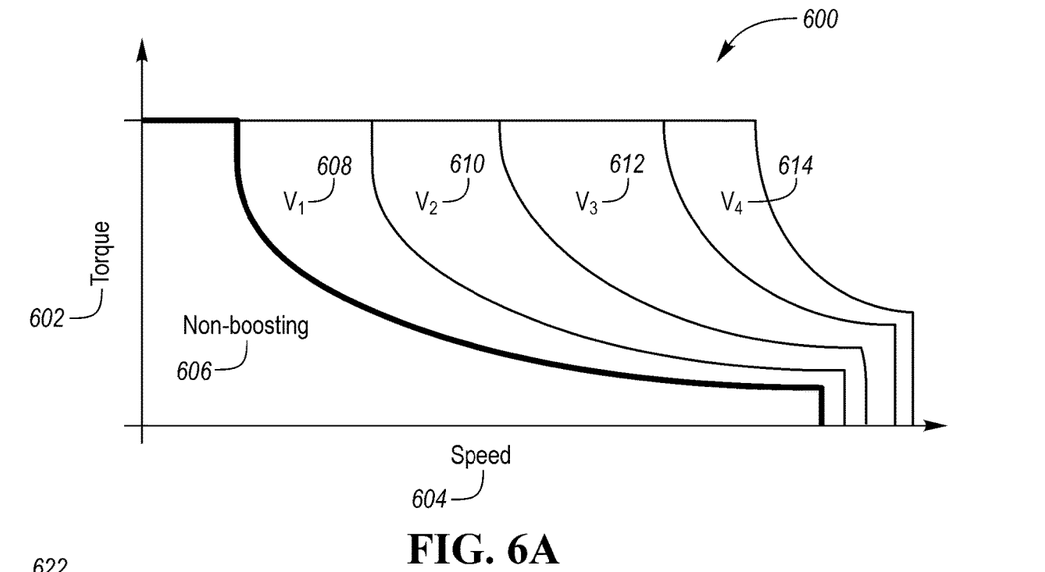
FIG. 6A is a graphical illustration of power limits for an electric machine at a motor torque with respect to angular speed and a bus voltage.

FIG. 6A is a graphical illustration 600 of power limits for an electric machine at a motor torque 602 with respect to angular speed 604 and a bus voltage. When the VVC is operated in a pass though mode, power capable of being provided by the electric machine is shown in the non-boosting area 606. After which the bus voltage is increased in steps, the first step is power associated with a first DC bus voltage $V_1$ 608, the second step is power associated with a second DC bus voltage $V_2$ 610, the third step is power associated with a third DC bus voltage $V_3$ 612, and the fourth step is power associated with a fourth DC bus voltage $V_4$ 614. A step level is a distance between consecutive DC bus voltage levels. A step interval is a distance between consecutive steps (608, 610, 612, 614). For example, a first step interval may be from 0 including the non-boosting area 606, a second step interval may be from the non-boosting area 606 including the first DC bus voltage $V_1$ 608, and so on. Here, the steps may be associated with a percentage of time the electric machine is operated (i.e., motor operation) within a region based on torque, speed, and power. The percentage may be a tenth of the total operating time (i.e., 10%, 20%, etc.), likewise a quarter of the total operating time (i.e., 25%, 50%, etc.) or some other symmetrical or asymmetrical division of the motor operation. For example, a controller may set the first DC bus voltage $V_1$ 608 to a voltage associated with motor operation between 100% and 75% of the time that needs boosting. Likewise, the controller may set the DC bus voltage $V_2$ 610 at the voltage associated with motor operation between 75% and 50% of the time, the DC bus voltage $V_3$ 612 at the voltage associated with motor operation between 50% and 25% of the time, and the DC bus voltage $V_4$ 614 at the voltage associated with motor operation between 25% and 0% of the time. The operational points may be calibrated to a predetermined set of voltages. In another embodiment, a controller may adjust each DC bus voltage ($V_1$ 608, $V_2$ 610, $V_3$ 612, and $V_4$ 614) dynamically based on historical driving, terrain, and conditions. In yet another embodiment, the DC bus voltages ($V_1$ 608, $V_2$ 610, $V_3$ 612, and $V_4$ 614) may be predetermined based on a driving mode. For example, the DC-DC converter may be limited in operating at certain voltages based on a user selection. Consider a user selections such as Economy that may limit operation to non-boosting and $V_1$ 608; while normal operation may be limited to non-boosting, $V_1$ 608, and $V_2$ 610; sport mode may be limited to non-boosting, $V_1$ 608, $V_2$ 610, and $V_3$ 612; and performance mode may allow all boosting capability including non-boosting, $V_1$ 608, $V_2$ 610, $V_3$ 612, and $V_4$ 614. The controller may also be configured to operate in a combination, such as the driving mode as described above with the addition of dynamically adjusting the voltage limits based on historical driving, terrain, and conditions. Some of the conditions may include weight of the vehicle due to payload or passengers, and road conditions such as snow or off-road (mud, sand). The percentage of operating time may be based on historical use such that two vehicles having different drivers adapt to the driving style of each independent driver. For example, step magnitude of a percentage of operating time for a driver with "a heavy foot" may be higher than the same percentage of operating time for a driver with "a light foot".

Often a DC-DC converter may be capable of outputting a voltage at a number of voltages. For example a DC-DC converter may be configured to output a voltage based on resolution of a PWM timer (e.g., an 8-bit timer may be able to resolve 256 levels, a 10-bit timer may be able to resolve 1024 levels, and a 16-bit timer may be able to resolve 65,536 levels) and therefore the DC-DC converter may be able to output 256 levels based on the 8-bit timer or 1024 levels based on the 10-bit timer. Here, the output voltages are limited to fraction of the total number of possible levels. For example, a DC-DC converter with an 8-bit timer capable of 256 levels may be configured to only output 16 levels thereby reducing the switching loss. Further, the 16 levels may be predetermined based on an operation mode (performance, sport, normal, or economy), or may be predetermined based on a predicted percentage of operation that may be determined during calibration.

Figure 6B:
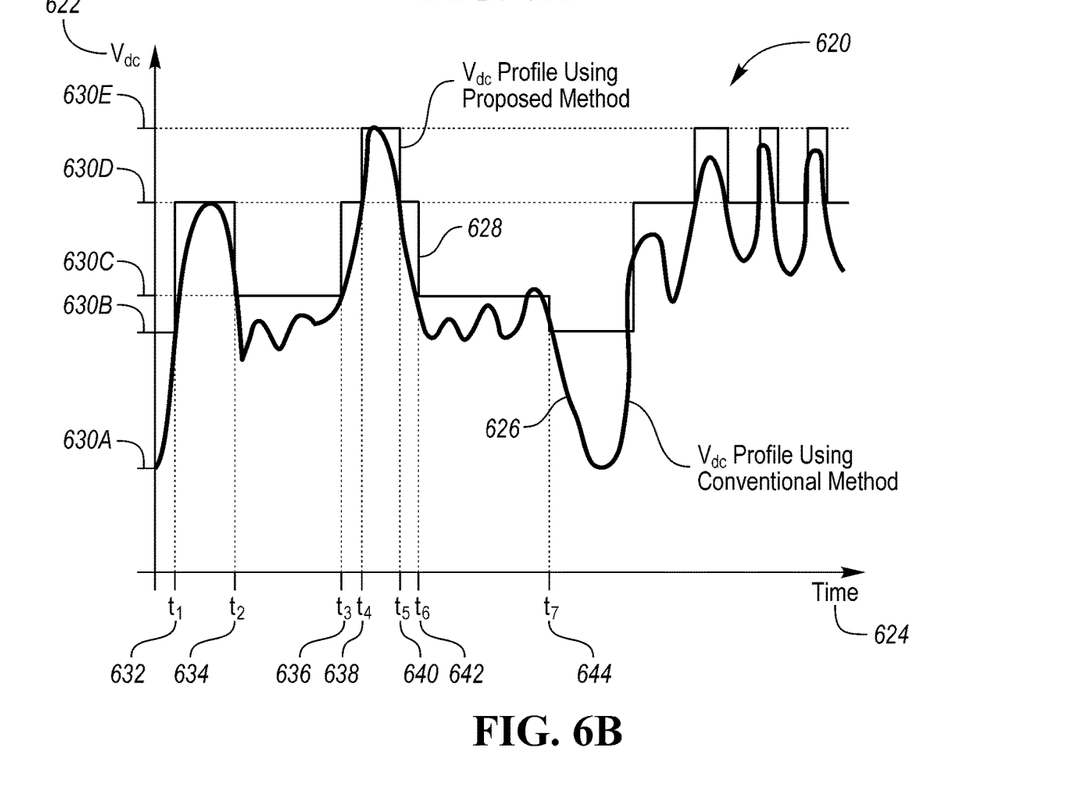
FIG. 6B is a graphical illustration of a bus voltage for a variable voltage converter supplying stepped voltages to the inverter with respect to time during a drive cycle of a hybrid vehicle.

FIG. 6B is a graphical illustration 620 of a bus voltage 622 for a variable voltage converter supplying stepped voltages to the inverter with respect to time 624 during a drive cycle of a hybrid vehicle. Here, a controller may be configured to modulate a DC-DC converter to adjust a DC bus voltage 622 to provide the required power at a given torque request and angular speed. However, unlike the continuous profile 626, the use of a stepped profile 630 in which the DC bus voltage 622 is output in a limited number of steps. The limited number of steps may be a predetermined number of steps, for example, the predetermined number may be 5, 10, 256, 1024, or other integer. Each of the limited number of steps may be selected from a set of predetermined steps as described above or may be dynamically calculated based on historical operation, driver input, terrain, location, or road conditions. Here, a total of 5 steps are shown; when the VVC is in a pass through mode, the voltage is a non-boosting voltage 630A that would operate in a non-boosting area 606. A first boosting voltage $V_1$ 630B would operate in the non-boosting area 606 and a $V_1$ area 608. A second boosting voltage $V_2$ 630C would operate in the non-boosting area 606, the $V_1$ area 608, and a $V_2$ area 610. A third boosting voltage $V_3$ 630D would operate in the non-boosting area 606, the $V_1$ area 608, the $V_2$ area 610, and a $V_3$ area 612. The last boosting voltage $V_4$ 630E would operate in the non-boosting area 606, the $V_1$ area 608, the $V_2$ area 610, the $V_3$ area 612, and a $V_4$ area 614. Here, the voltage steps are shown to vary or change in voltage between each step. In other embodiments the change in voltage in between steps may be equal, or a combination of equal and not equal. Also as shown, there are points in which the stepped voltage provides additional power at a given torque and speed, and likewise, there are points at which there is a deficiency of demanded power at a given torque and speed with respect to the stepped profile 628. This may be done to reduce the voltage level switching and associated losses.

Further, this stepped profile 628 may maintain the voltage at a specific voltage level when it detects that the electric powertrain may be operated at an increased or decreased voltage step to conserve switching. If it is determined that the electric powertrain may be operated at an increased or decreased voltage step, the controller may maintain the current voltage level if the controller determines that the increased or decreased voltage step is temporary in which the time associated with the increased or decreased voltage step is less than a predetermined time period. That predetermined time period may be associated with transmission losses of power and a rate of change of the DC bus voltage the DC-DC converter is capable of producing at a given torque and speed.

Here, the vehicle starts out a first boosting level 630A, and upon reaching a first time $t_1$ 632, based upon a rate of change of power demand at a given torque and speed, the controller increases the boost voltage 622 to a third boost level $V_3$ 630D. As the controller commands the DC-DC converter operating that the first boost level $V_1$ 630B to increase to the third boost level $V_3$ 630D, the DC-DC converter only generates the second boost level $V_2$ 630C as a transient increasing from the first to the third. The controller then maintains the boost level from the first time $t_1$ 632 to the second time $t_2$ 634 as the power demand is kept under the maximum power available at that DC bus voltage 622, (e.g., the third boost level $V_3$ 630D). As the power demand decreases at the second time $t_2$ 634, the controller commands the DC-DC converter to operate at the second boost level $V_2$ 630C. Between the second time $t_2$ 634 and the third time $t_3$ 636, the power demand fluctuates and at times drops below the first boost level $V_1$ 630B, however, the controller may be configured to maintain the boost level at the second boost level $V_2$ 630C based on a predicted future operation. The predicted future operation may be based upon navigation data that is in communication with the controller whereas the navigation data includes changes in terrain, slope, road conditions, and traffic along a route mapped by a navigation system. If the power demand is less than the power available at the current boost voltage but only for a short dip, the controller may maintain the voltage at the current level to reduce circulating losses.

Likewise, if the power demand is greater than the power available at the current boost voltage but only for a short burst, the controller may maintain the voltage at the current level to reduce switching losses, even though this may result in slight degradation in momentary performance. The controller may also incrementally increase and decrease the boost voltage 622 as shown as the stepped voltage 628 progresses from time $t_3$ 636, to $t_4$ 638 and from time $t_5$ 640 to time $t_6$ 642. Similar to the operation between times $t_2$ 634 and $t_3$ 636, the operation between times $t_6$ 642 and $t_7$ 644, the power demand is maintained at a DC bus voltage 622 (i.e., boost level 630C) even when the power demand momentarily increases above the available power at the boost level 630C or when the power level drops below the next lower boost level (i.e., boost level 630B).

In some instances, the DC-DC converter may be configured to limit the DC bus voltage 622, for example, if a vehicle was being operated in a performance mode, all DC bus voltage levels 630 (step voltages) would be available, however, if an operator of the vehicle selected a lower mode, such as a sport mode, the DC bus voltage level may be limited to a sport level 630D in which any demand for power greater than what is available at the torque, speed, and bus voltage would limit the power to the powertrain.

Figure 7:
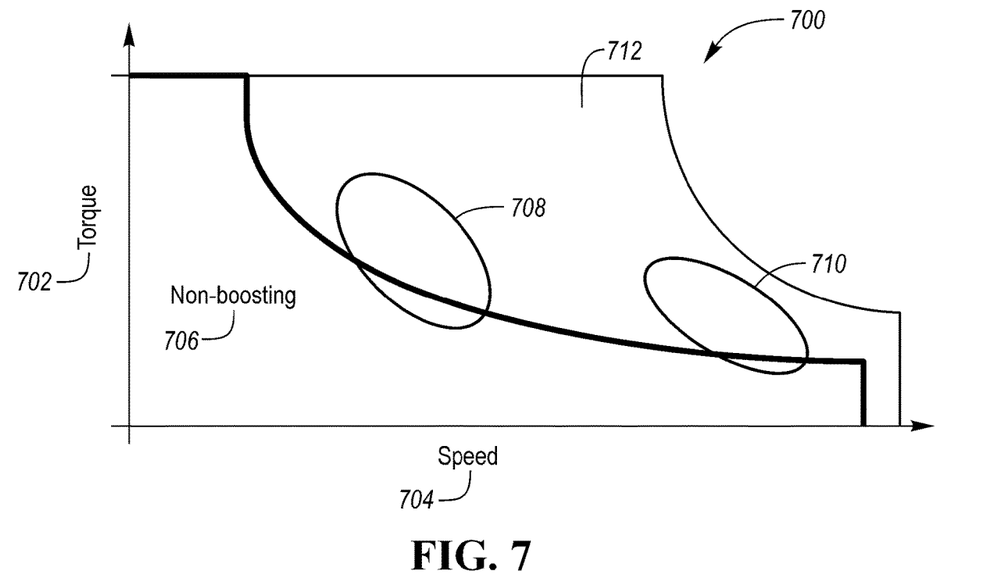
FIG. 7 is a graphical illustration of power limits for an electric machine at a motor torque with respect to angular speed and a bus voltage further illustrating operating zones.

FIG. 7 is a graphical illustration 700 of power limits for an electric machine at a motor torque 702 with respect to angular speed 704 and a bus voltage further illustrating operating zones. Similar to earlier graphical illustrations, the power available at a given torque 702 and angular speed 704 at a bus voltage in which the battery voltage is passed through the DC-DC converter is a non-boosting area 706 and a maximum power available at a given torque 702 and angular speed 704 with the DC-DC converter boosting the battery voltage within a maximum boosting area 712. Within the maximum boosting area are operating zones such as a city zone 708 and a highway zone 710. Basically, when the vehicle is operating on city streets, for a majority of the time the vehicle is operated in the city zone 708. The majority of the time may be a specific percentage such as 70%, 80% or 90% of the time that needs boosting. As such, the controller may be configured to operate at a DC bus voltage to supply the power necessary to operate in the city zone 708. The controller operation may be based on a user input selection (e.g., driver selecting a city mode) or navigation data indicative of city driving. Likewise, the controller may be configured to operate at a DC bus voltage to supply the power necessary to operate in the highway zone 710. The controller operation may be based on a user input selection (e.g., driver selecting a highway mode) or navigation data indicative of either current motion on a highway or future highway driving.

Figure 8:
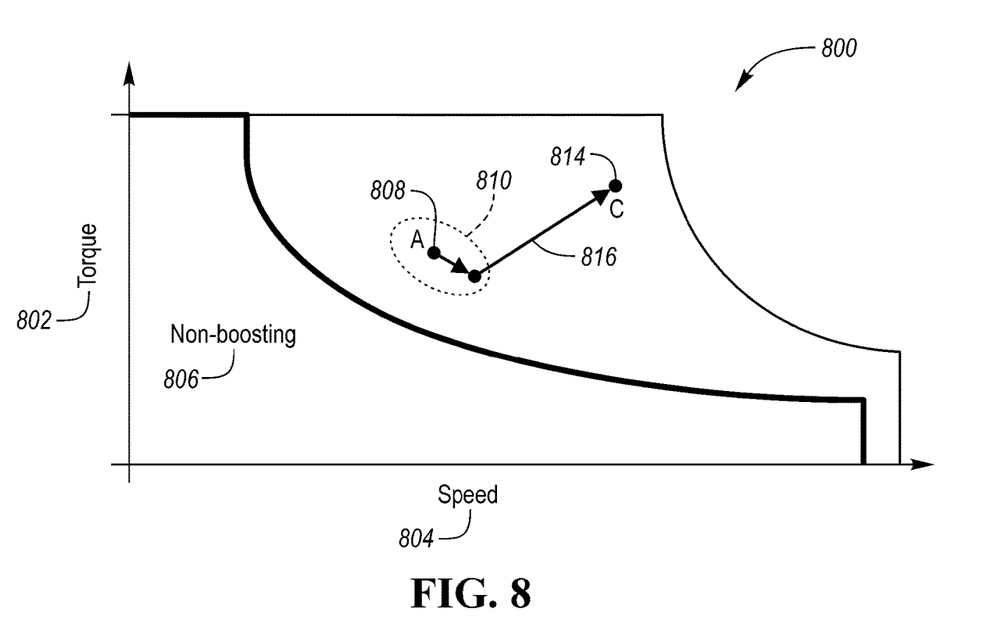
FIG. 8 is a graphical illustration of power limits for an electric machine at a motor torque with respect to angular speed and a bus voltage further illustrating hysteresis in limited operating zones.

FIG. 8 is a graphical illustration 800 of power limits for an electric machine at a motor torque 802 with respect to angular speed 804 and a bus voltage further illustrating hysteresis in limited operating zones. The power available at a given torque 802 and angular speed 804 at a bus voltage in which the battery voltage is passed through the DC-DC converter is a non-boosting area 806 and a maximum power available at a given torque 802 and angular speed 804 with the DC-DC converter boosting the battery voltage within a maximum boosting area. Within the maximum boosting area is an operating zone 810 that has a specific point at which the power demand at a specific torque 802, speed 804, and bus voltage. When in this operating zone 810 (e.g., available power at a given DC bus voltage and range of torque 802 and speed 804) the controller may maintain the DC bus voltage so that the power is available that is greater than the power demands. Also, operating in the zone 810, the controller may be configured to utilize hysteresis so the controller may maintain the DC bus voltage. However, if a power demand 814 is outside the scope of the operating zone 810, the controller may increase the DC bus voltage to allow a transition 816 to the power demand 814.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A powertrain comprising:
    a DC-DC converter configured to output a bus voltage;
    an electric machine; and
    a controller configured to, in response to a torque request exceeding an available torque of the electric machine, command the converter to boost the bus voltage to a discrete step value selected from a predetermined number of available discrete step values, that changes in response to a selected operating mode of the powertrain, to increase the available torque, wherein magnitudes of at least some of the available discrete step values are based on percentages of drive-cycle time at which the powertrain operates with particular torques, speeds, and powers.

2. The powertrain of claim 1, wherein a magnitude of each of the available discrete step values is based on the selected operating mode.

3. The powertrain of claim 1, wherein the controller is further configured to update the magnitudes of the at least some of the available discrete step values based on historical operating data of the powertrain.

4. The powertrain of claim 1, wherein the controller is further configured to hold the discrete step value for at least a predetermined duration.

5. The powertrain of claim 4, wherein the predetermined duration is defined by the selected operating mode.

6. The powertrain of claim 1, wherein the selected operating mode is selected by a user.

7. The powertrain of claim 1, wherein the selected operating mode is performance, sport, normal, or economy.

8. A vehicle comprising:
    an electric machine configured to provide propulsive force to the vehicle at a bus voltage; and
    a controller configured to cause a converter to output the bus voltage at a discrete step value that is selected from a predetermined number of available discrete step values, and to change at least some of the available discrete step values in response to an operating mode of the electric machine, wherein magnitudes of at least some of the available discrete step values are based on percentages of drive-cycle time at which a powertrain that includes the electric machine operates with particular torques, speeds, and powers.

9. The vehicle of claim 8, wherein the controller is further configured to change the predetermined number in response to the operating mode of the electric machine changing.

10. The vehicle of claim 8, wherein the controller is further configured to update the magnitudes of the at least some of the available discrete step values based on historical operating data of the powertrain that includes the electric machine.

11. The vehicle of claim 8, wherein the controller is further configured to hold the discrete step value for at least a predetermined duration.

12. The vehicle of claim 11, wherein the predetermined duration is defined by the operating mode.

13. The vehicle of claim 8, wherein the operating mode is selected by a user.

14. A method of controlling a DC-DC converter comprising:
    in response to a torque request to a motor coupled with the converter exceeding an available torque, outputting by the converter for at least a predetermined duration a bus voltage at a discrete step value selected from a predetermined number of available discrete step values, and updating magnitudes of at least some of the discrete step values based on historical powertrain operating data; and
    in response to a selected powertrain operating mode, changing the predetermined number.

15. The method of claim 14, wherein the predetermined duration is based on the selected powertrain operating mode.

16. The method of claim 14, wherein the magnitudes are based on the selected powertrain operating mode.

17. The method of claim 16, wherein the selected powertrain operating mode is sport, normal, or economy.

* * * * *